United States Patent [19]

Vosacek

[11] Patent Number: 4,499,539
[45] Date of Patent: Feb. 12, 1985

[54] METHOD AND APPARATUS FOR LIMITING ALLOCATED DATA-STORAGE SPACE IN A DATA-STORAGE UNIT

[75] Inventor: Robert H. Vosacek, Tucson, Ariz.

[73] Assignee: International Business Machines Corporation, Armonk, N.Y.

[21] Appl. No.: 450,894

[22] Filed: Dec. 20, 1982

[51] Int. Cl.³ .............................................. G06F 13/00
[52] U.S. Cl. ................................................... 364/200
[58] Field of Search .............................. 364/200, 900

[56] References Cited

U.S. PATENT DOCUMENTS 4,025,901  5/1977  Bachman et al. .................. 364/200
4,430,712  2/1984  Coulson ............................. 364/300

Primary Examiner—Gareth D. Shaw
Assistant Examiner—Tim A. Wiens
Attorney, Agent, or Firm—H. F. Somermeyer

[57] ABSTRACT

A data-storage buffer transfers data signals with other units in relatively large blocks of data. Such large blocks storable in large address spaces are not always filled with meaningful data. To more efficiently use the data-storage space in the data-storage buffer, the allocatable unit or segment of the data buffer is made smaller than the data capacity of the large block. Each time a large block of data is to be written into the data buffer, a sufficient number of the segments for storing data of one large block is allocated for receiving the data. After the data of the one block is written into the data buffer, the allocated segments are examined; all of the allocated segments not storing data from the one large block are deallocated. The invention is particularly useful for data buffers acting as cached data storage for large-capacity direct-access storage devices (DASD) and are coupled to host processors programmed to operate with such DASD. The procedure is followed for data written into the caching data storage whether supplied by DASD or the host processors.

10 Claims, 5 Drawing Figures

«4,499,539»

METHOD AND APPARATUS FOR LIMITING ALLOCATED DATA-STORAGE SPACE IN A DATA-STORAGE UNIT

FIELD OF THE INVENTION

The present invention relates to multilevel data-storage hierarchies, more particularly to the control thereof with respect to data-storage allocated for data resident in upper levels of the data-storage hierarchies.

BACKGROUND OF THE INVENTION

Peripheral storage hierarchies have been used for years for providing an apparent store as suggested by Eden, et al in U.S. Pat. No. 3,569,938. Eden, et al teach that in a demand paging or request system, caching data in a cachetype, high-speed front store (buffer) can make a peripheral storage system appear to have a large capacity, yet provide rapid access to data; rapid access being faster than that provided by the normal backing store. Eden, et al also teach that the backing store can be a retentive store, such as magnetic tape recorders and magnetic disk recorders while the front store can be a volatile store, such as a magnetic core store. With the advances in data-storage technology, the front store typically includes semiconductive type data-storage elements. U.S. Pat. No. 3,839,704 shows another form of such a storage hierarchy. An important aspect of storage hierarchies is good performance at low cost.

Storage hierarchies have taken diverse forms. For example, in accordance with the Eden, et al U.S. Pat. No. 3,569,938 a single high-speed store serviced several users. U.S. Pat. No. 3,735,360 shows that each processor can have its own high-speed store or cache. Performance of storage hierarchies also is affected by the algorithms and other controls used to place predetermined data into the cache or high-speed storage portion. Along this line, U.S. Pat. No. 3,898,624 shows that varying the time of fetching data from a backing store to a front or caching store can be selected by computer operator in accordance with the programs being executed in a using CPU. In this manner, it is hoped that the data resident in the cache or upper level of the hierarchy will be that data needed by the CPU while other excess data is not resident in the cache. This arrangement allows more useful data to be stored in the higher level storage portion. All of these operations become quite intricate. Accordingly, evaluation programs for storage hierarchies have been used to evaluate how best to manage a storage hierarchy. U.S. Pat. Nos. 3,964,028 and 4,068,304 show performance monitoring of storage hierarchies for achieving these goals. Even at that, much remains to be done in various types of storage hierarchies for enhancing optimum performance while ensuring data integrity. Much of the work with respect to storage hierarchies has occurred in the cache and main memory combinations connected to a using CPU. The principles and teachings from a cached main memory relate directly to caching and buffering peripheral systems, as originally suggested by Eden et al, supra. Of course, main memory has been used prior to Eden, et al for buffering or caching data from a magnetic tape and disk unit for a CPU, i.e. a main memory was not only used as a CPU working store but also as a buffer for peripheral devices.

The performance monitoring referred to above has indicated that it is not always in the best interests of total data-processing performance and integrity to always use a caching buffer interposed between a using unit and a backing store. For example, U.S. Pat. No. 4,075,686 teaches that a cache can be turned on and off by special instructions for selectively bypassing the cache. Further, the backing store or memory was segmented into various devices with some of the devices or segments being bypassed, such as for serial or sequential input/output operations. U.S. Pat. No. 4,268,907 teaches that for a command specifying the fetching of data words, an indicator flag is set to a predetermined state. Such flag conditions replacement circuits to respond to subsequent predetermined commands to bypass cache storage for subsequently fetched data words when the indicator flag is in the predetermined state to prevent replacement of extensive numbers of data instructions already stored in cache during the execution of such instructions. Interestingly, U.S. Pat. No. 4,189,770 shows bypassing cache for operands, but using cache for storing instructions.

Disk storage apparatus, also referred to as direct access storage devices (DASD), provide large quantities of random-access nonvolatile data-storage for data processing. Caching the DASD, as suggested above, provides a storage hierarchy with the performance and throughput capability better than that of DASD. Such performance improvement is obtained principally by maximizing the number of data-storage accesses which can be satisfied by accessing a copy of the data in the cache rather than by directly accessing the DASD. Management of the data-storage hierarchy includes dynamically entering data into and deleting data from the cache with the intent of increasing the proportion of the number of accesses that can be satisfied through the cache. While such management tends to reduce the size of a front store for controlling its costs, it has been observed that data does not always fill the record tracks of DASD, hence further savings may be available. All of the above shows a need for carefully managing utilization of data-storage space in a front store for controlling its costs. Such cost control is important where large blocks of data, such as 30 kilobytes or more are cached in a front store and such blocks are not always filled with data signals.

The management of data-storage apparatus for ensuring full utilization of such space available in any data storage unit includes storing variable-length data. For example, U.S. Pat. No. 3,739,352, shows a microprogrammed processor associated with a so-called "free-field" memory in which operands of any length in terms of number of bits can be processed. The free-field memory is addressed by an address register that points to the boundary between any two bits stored in the memory as the start of a field and indicates the number of bits in the field up to a maximum bit capacity of the memory. While this technique certainly appears to provide for a maximal packing of a given memory (data-storage unit), when such data is replaced by other data the probability of the replacing data having an extent (number of bits) equal to the data being replaced is relatively small. This means that each time data is replaced that the memory must be reformatted if the storage efficiency is to be maintained. Accordingly, this technique, while probably valuable for many applications, is not applicable to a front-store/back-store data-storage hierarchy because of the data replacement operations. As a result of such a scheme, it can be easily envisioned that fragmentation of data would occur which requires extensive and time-consuming management techniques not desired in a peripheral data-storage hierarchy.

A second U.S. Pat. No. 3,824,561 relates to storing groups of variable-length data elements which are allocated to storage addresses by means of apparatus and methods using characteristic data sets which define the characteristics of each data element in the group to be stored. This technique requires that the data sets be scanned in two directions. On a first pass, information as to the length and boundary requirements of each element are accumulated, then on a second pass addresses are allocated to each element to eliminate gaps in the group while maintaining proper boundary alignment. Again, this technique has value in certain applications but in the data-storage hierarchy, the replacment requirements plus the requirement of relatively low cost prohibit the complicated control. Performance requirements of a peripheral data-storage hierarchy are at odds with the first and second time-consuming pass requirements for doing an allocation. Accordingly, while this technique can provide efficient utilization of a data-storage unit, the techniques are not applicable to a data-storage hierarchy front store management where replacement and performance are intermingled with allocations of data-storage space for variable length data.

U.S. Pat. No. 4,027,288 shows using a character set including a beginning delimiter character and an ending delimiter character such that information segments may be of any length up to the capacity of the storage mechanism. Automatic data-storage allocation and reclamation of unused storage space as strings of data increase or decrease in size is provided for. This system employs symbolic addressing data on a magnetic tape wherein delimiter signals and sequential operations can take advantage of the described data-packing technique. For a random-access memory which is found in most front stores of a data-storage hierarchy, this technique is not applicable for achieving data packing while maintaining low cost and good performance.

U.S. Pat. No. 4,035,778 shows allocation of working space in a main memory of a host processor which optimizes the allocation by adjusting the size of the working set for each competing program. In a sense, the working memory can be considered as a buffer in the data-storage hierarchy wherein the host processor has a close-working association with the front store, i.e. the working memory. The techniques of this patent also relate to replacement controls such that the allocations of the working space is adjusted through replacement techniques. Peripheral data-storage hierarchies, because of the loose-coupling to the host processor, cannot take advantage of the described technique.

In a peripheral data-storage unit, U.S. Pat. No. 4,103,329 shows handling data represented by variable field length for using less data-storage. The bit fields are handled independently in the natural storage addressing elements and boundaries. This patent shows initializing a displacement register to contain an element displacement from a base address which contains the first bit of a desired bit field. While such a technique is certainly appropriate for packing data into a main memory for use by a host processor, the complexity and tracking of all of such data wherein the quantity of data is in the megabyte range becomes excessively expensive. Accordingly, these later-described techniques are also not fully satisfactory for managing a front store of a peripheral data-storage hierarchy.

Yet other techniques employed for improving utilization of data-storage apparatus include that described in the IBM TECHNICAL DISCLOSURE BULLETIN by Paddock, et al, Vol. 14, No. 7, December 1971, pages 1955 through 1957. This article shows an asymmetrical high-speed storage consisting of an 8 KB (kilobytes) area and two 4 KB areas, each area has a separate directory. Apparently smaller sets of data would be stored in the 4 KB areas while larger sets of data would be stored in the 8 KB area. Such a technique does not address the suitability of managing a front store where relatively large blocks of variable length data, i.e. 30 KB or greater are to be transferred as units. In another IBM TECHNICAL DISCLOSURE BULLETIN article by Gates, et al, "Multiword Size Storage" in Vol. 14, No. 8, January, 1969, pages 1019-1020 shows managing a data-storage apparatus for avoiding wasting or nonuse of storage bits due to difference in word sizes of data. The techniques of this article relate to storing words having two different sizes and alternating the storage such that no unused disks are employed. This article approaches the management of a data-storage apparatus only for an extremely limited set of data formats and hence is not applicable to a general storage apparatus.

Even with all of the above-described apparatus and techniques for managing a data-storage apparatus for maximizing utilization. There still is needed a relatively simple but effective management apparatus and method which can handle large units of data at relatively low cost while maximizing data-storage utilization and preserving high performance.

SUMMARY OF THE INVENTION

In accordance with the invention, data-storage apparatus has allocatable data-storage spaces each having a data-storage capacity less than a maximal capacity required for given data transfers. Upon each incoming data transfer, an initial maximal allocation of data-storage space in the data-storage unit is made for the expected data. The data is then transferred to the allocated data-storage space. Upon completion of the data transfer, an examination is made of which allocated data-storage spaces actually received none of the incoming data. All of those allocated data-storage spaces receiving no such data are then deallocated and allowed to be used for storing other data.

In another context, a maximal initial allocation of data storage space is made in accordance with the size of a maximal data transfer and upon completion of the data transfer the initial allocation is reduced to the size of the actual data transfer with all remaining portions of the allocated data-storage spaces being deallocated.

The foregoing and other objects, features, and advantages of the invention will be apparent from the following more particular description of the preferred embodiments of the invention, as illustrated in the accompanying drawings.

DETAILED DESCRIPTION

Figure 1:
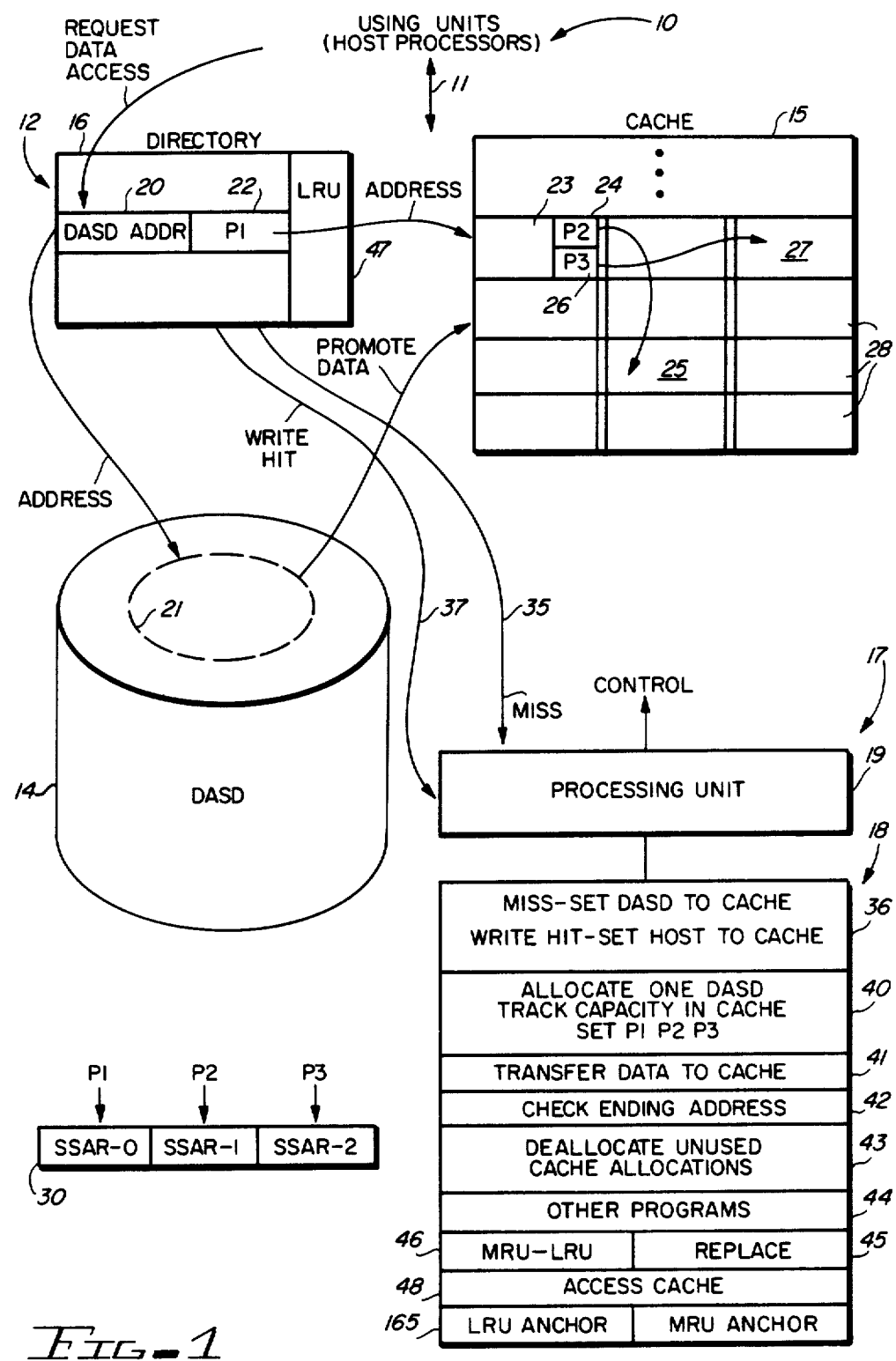
FIG. 1 is a block-flow diagram illustrating an operation of the present invention for a data-storage unit accessible through a data-storage directory.
Figure 2:
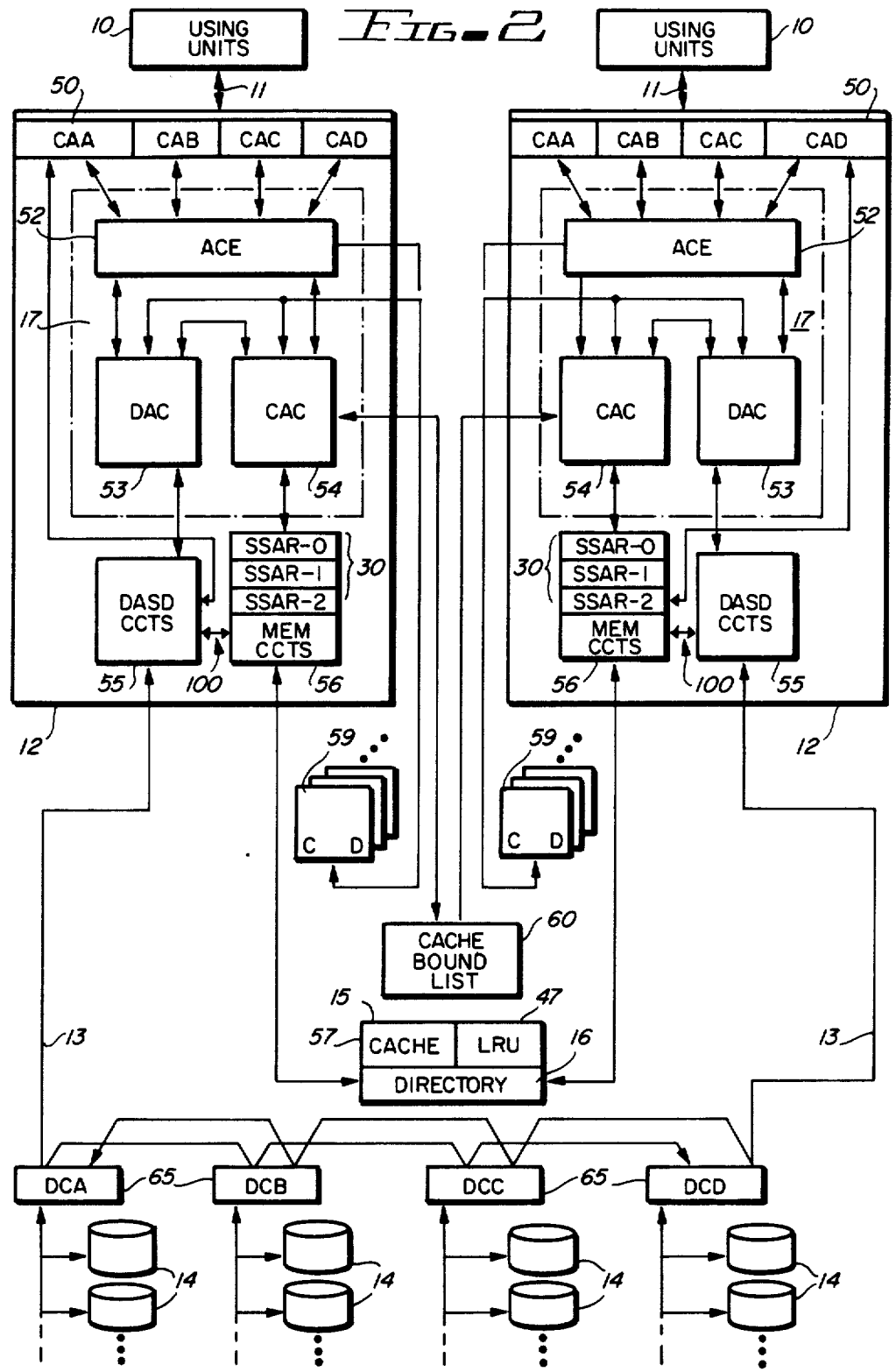
FIG. 2 is a block diagram of a preferred implementation of the invention within a peripheral data-storage hierarchy for implementing the techniques shown in FIG. 1.

Referring now more particularly to the drawings, like numerals indicate like parts and structural features in the various diagrams. As shown in FIGS. 1 and 2, one or more using units 10, such as central processing units, host processors and the like, are connected via peripheral connections 11 to storage director 12. Storage director 12 is suitably connected via a device interface 13 to a plurality of direct access storage devices (DASD) 14. A cache 15 selectively couples DASD 14 to one or more of the units 10 via input/output connection 11. Access to data stored in the cache 15 is via directory 16. A using unit 10 requests data access to the storage subsystem including front store or cache 15 and backing store or DASD 14 by using an address identified for DASD 14. Such address, when stored in directory 16, refers to data stored in cache 15 such that the data-access request can be satisfied without referring to DASD 14. Operations of the storage system is under control of a programmed processor 17 which includes a control memory 18 and a processing unit 19. Control memory 18 stores program indicia for enabling the processing unit 19 to exercise suitable control over cache 15, directory 16 and DASD 14 and facilitate communications with using units 10. Most of the functions performed by programmed processor 17 in response to the stored program indicia are well known data-storage functions for storage systems of the type described and which are not detailed for that reason.

Directory 16 has a plurality of registers, as later detailed with respect to FIG. 5; each of which includes a stored DASD address (DASD ADDR) 20 which identifies the DASD 14 address which is intended to store or is actually storing data that is currently stored at an addressable portion of cache 15. The cache 15 storage location is indicated by cache address pointer P1 contained in section 22 of each directory 16 register or can be indicated by which directory 16 register is storing DASD ADDR; i.e. directory 16 register addresses are mapped to cache 15 addressable data-storage spaces. In accordance with the invention, cache 15 has allocatable data-storage spaces (sets of addressable data-storage register which are allocated as a single unit) having a capacity smaller than the data-storage capacity of a data-storage track 21 on DASD 14 pointed to by the DASD address 20 in directory 16. Preferably the capacity of the allocatable data-storage space in cache 15 is an integral submultiple of the maximum capacity of the data-storage track 21. For the present description the allocatable data-storage space of cache 15 is one-third the capacity of the DASD 14 track capacity. Three cache 15 addresses are required to address contents of a complete DASD track stored in cache 15. This addressing is achieved by having an address pointer P1 in section 22 of directory 16 identifying an allocatable data-storage space 23 of cache 15 for storing a first one-third portion of a DASD 14 track. In this one portion of allocatable data-storage space 23 are a pair of pointers P2, P3, respectively in spaces 24 and 26. P2 contains an address pointing to allocatable data-storage space 25 of cache 15 which stores the second one-third portion of track 14 while P3 points to an addressable, allocatable data-storage space 27 of cache 15 which stores the third one-third portion of track 14. In this manner the three allocatable data-storage spaces of cache 15 are concatenated to store the data contents of one track. It is to be understood that the number of said multiples of allocatable units in cache 15 may be a number other than three and that the additional pointers such as pointers P2 and P3 instead of being stored in the first allocatable space 23 pointed to by directory 16 may in fact be stored in area 22 along with pointer P1 in directory 16. Storing the addresses P2, P3 within cache 15 simplifies directory 16's structure; it does require one additional access to cache 15 for setting up data transfers, as will become apparent.

In accordance with the invention, when cache 15 is to receive data from either a using unit 10 or from DASD 14, programmed processor 17 will not have an indication of the extent of data which cache 15 will receive. That is, it may be a full track of data or less than a full track of data. Accordingly, each time cache 15 is to receive data, three allocatable data-storage spaces of cache 15 are allocated for the upcoming data transfer. Following such allocation, the data transfer ensues. Upon completion of the data transfer, programmed processor 17 examines which of the allocated data-storage spaces, such as 23, 25 and 27, have in fact received data for storage. Those allocated data-storage spaces of cache 15 not receiving any data during such data transfer are then deallocated, via appropriate pointers being zeroed and are made available for reallocation of data not related to the just-addressed DASD 14 track. In this manner, management of cache 15 data-storage space allows a greater number of tracks to be effectively stored in cache 15 with a relatively smaller cache capacity, i.e. reduces cost. In another view, if the same size cache 15 is used, then a greater performance is provided because the contents of a greater number of addressable DASD 14 data-storage tracks can be stored in cache 15. Cache 15, of course, has a large plurality of such allocatable data-storage spaces, as collectively indicated by numeral 28 and ellipsis 29.

Figure 4:
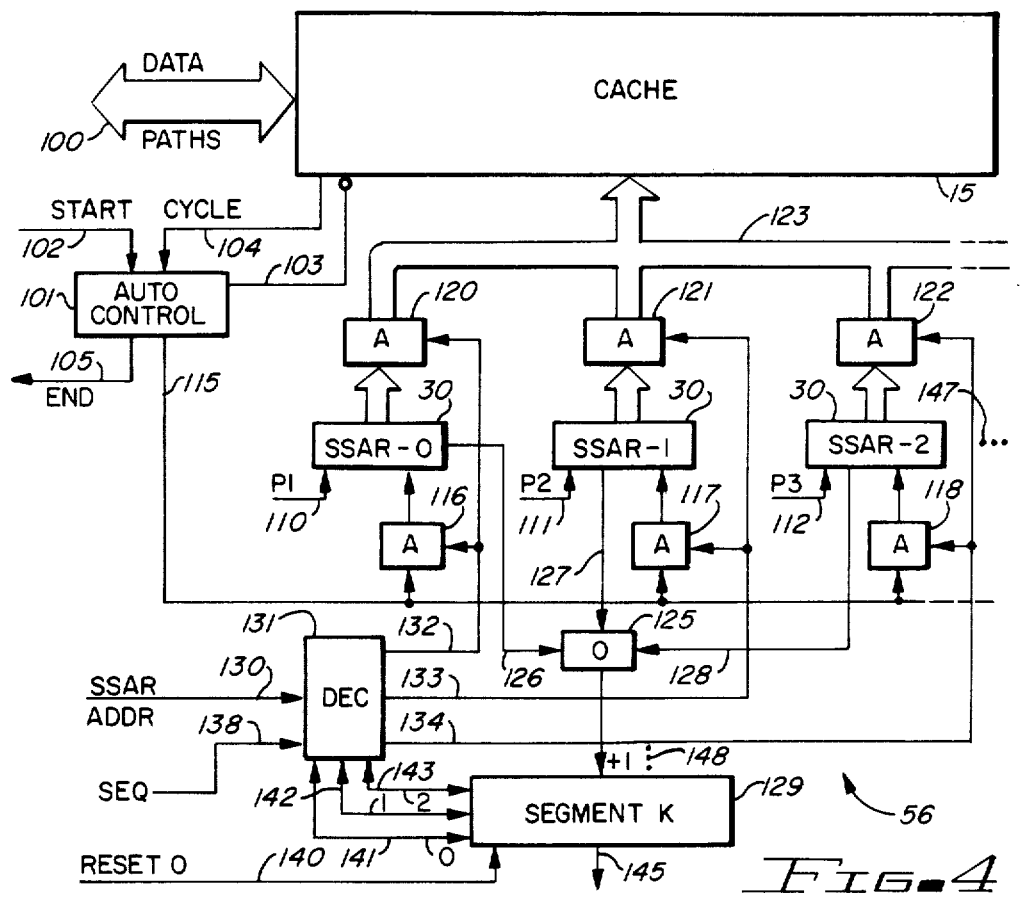
FIG. 4 is a logic diagram for showing transferring a plurality of segments of data into a data-storage apparatus using the techniques set forth in FIG. 1.

The scattering of data from a single addressable data-storage track into a plurality of unrelated segments or data-storage spaces of cache 15 when high-speed data transfers are involved requires rapid concatenation and some buffering during the data transfer. For enhanced flow of data signals into and out of cache 15, as best seen in FIGS. 1 and 2, a plurality of system storageaddress registers 30 are provided. SSAR-0 receives pointer P1 from directory 16 in preparation for accessing allocated data-storage space 23. SSAR-1 and SSAR-2 respectively receive pointers P2 and P3 from areas 24, 26 of allocated data-storage space 23. This action completes the preparation for an ensuing data transfer. FIG. 4 shows how a plurality of address registers can quickly concatenate a plurality of addressable data-storage spaces for receiving a highspeed burst of data signals.

Upon each received data-access request, programmed processor 17 examines directory 16 to determine whether or not an associated allocatable data-storage space has been allocated to the DASD address received from using unit 10. If there is no match, then a cache-miss occurs, as indicated by numeral 35. Such a cache-miss can result in a data promotion from DASD 14 into cache 15, as will be later detailed. Such a miss activates processing unit 19 to access control store 18 for executing program 36 which may result in transferring data from DASD 14 to cache 15. Further, a cache write-hit, which indicates data will be transferred from a using unit 10 into cache 15, results in programmed processor 17 responding, as indicated by arrow 37, to use program 36 for preparing cache 15 to receive data from host 10, which may include up to a full track of data the extent of which, of course, is not presently known to the data-storage system. In such a host write, the host data is preferably simultaneously written to DASD 14.

Figure 3:
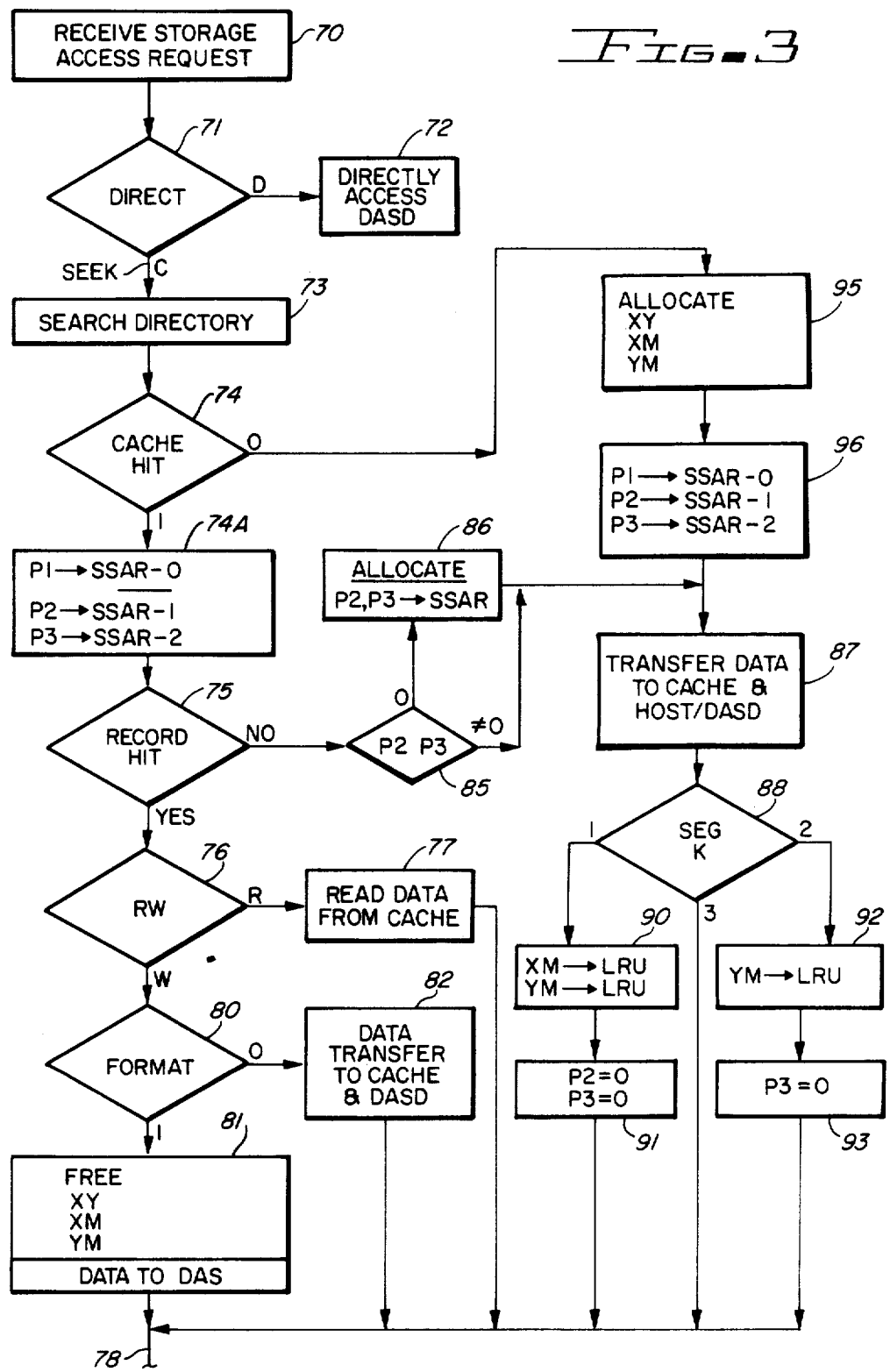
FIG. 3 is a machine operations chart illustrating the operations of the FIG. 2 illustrated system using methods shown in FIG. 1.

In any event, for cache 15 to receive data without any overrun exposure results in programmed processor 17 in responding to program 36 to execute program 40 for allocating one DASD track capacity in cache 15 and setting the pointers P1, P2 and P3 as may be required. For example, if no cache 15 data-storage space has been allocated, then three cache 15 data-storage spaces are allocated with the corresponding pointers being generated. If on the other hand only one data-storage space is currently allocated, then two more data-storage spaces are allocated with the corresponding pointers being generated, all of which is detailed later with respect to FIG. 3. Upon completion of executing program 40, programmed processor 17 executes program 41 which actually causes the transfer of data to the cache 15 from either host 10 or DASD 14, as the case may be. Upon completion of the data transfer, programmed processor 17 checks the ending address of the last byte of data transferred into cache 15 by executing program 42. This check identifies which allocated data-storage spaces in fact received no data during the data transfer; i.e. the ending address check determines which of the three allocated data-storage space last received data. Then programmed processor 17 by executing program 43 deallocates any unused cache allocations made for the data transfer. Of course, preparatory to the execution of programs 36 and 43 and thereafter, other programs 44 which are commonly found in data-storage subsystems are executed. Since such programs do not have a bearing on an understanding of the present invention, they are not detailed.

In program 40 it may be required that programmed processor 17 replaced existing data in cache 15. Free or unallocated data-storage spaces must be identified. This action is achieved by an LRU (least recently used) replacement control list 47, usually found in data-storage hierarchies, explained with respect to FIG. 5. LRU 47 includes identification of those allocatable data-storage spaces which are available for allocation. Accordingly, execution of program 40 by programmed processor 17 results in usage of MRU-LRU program 46 for scanning LRU 47 to allocate data-storage spaces. If sufficient allocatable data-storage spaces are found, then those spaces are allocated with no further activity. However, if no allocatable data-storage spaces are found, then programmed processor 17 uses replace program 45 for transferring data from a replaced one of the allocated data-storage spaces to DASD 14 using known replacement techniques. When DASD 14 is updated concurrently with cache 15, the cache 15 space is immediately reallocated to the incoming data without any prereplacing data transfers to DASD 14. In this manner, cache 15 can be always filled with promoted data. Program 48 enables programmed processor 17 to access cache 15 using known techniques; accordingly, this program is not detailed.

FIG. 2 illustrates a preferred embodiment of the invention as employed in a two-storage director 12 data-storage arrangement. Each storage director 12 includes a plurality of so-called channel adaptors 50, also separately denominated as CAA through CAH, which connect the respective storage directors 12 to a plurality of using units 10 via a plurality of input/output connections 11. Each storage director 12 includes a programmed processor 17 which, as usual, includes a processing unit 19 having a control store 18 which contains computer programs for performing the storagedirector functions. FIG. 2 shows the logical structure; i.e. the functions performed by processor 19 in executing the programs in control store 18. The programmed processor 17 includes programs constituting address and command evaluator ACE 52 which receive and evaluate using unit 10 supplied peripheral commands. Such functions are also performed in present day storage directors for noncached DASD as widely sold throughout the world and are a part of other programs 44 in FIG. 1. The programmed processor 17 also includes programs for direct access control DAC 53 which responds to commands evaluated and decoded by ACE 52 to control data transfers between using units 10 and DASD 14, as well as providing device commands to DASD 14 for performing well known DASD access and control functions. DAC 53 includes program 41 as well as programs for accessing DASD 14 included in other programs 44 relating to accessing DASDs 14 and transferring data between using units 10 and DASDs 14, all of which is well known. Programmed processor 17 further includes programs CAC 54 which is a cache access control for accessing cache 15. CD latches 59, one for each of the DASDs 14, are accessed by DAC 53 and CAC 54 respectively for determining whether to access cache 15 or DASD 14 directly and for setting the latches to D upon a cache miss. Connections from storage director 12 to DASDs 14 are via DASD circuits 55 which are constructed using known device adaptor and data-flow design techniques. Cache 15 is accessed via memory circuits (MEM CCTS) 56 which includes those circuits for generating addresses and access requests including SSARs 30. Cache 15 is a portion of a large random-access store 57, hereinafter referred to as a system store. It is preferred that cache 15 can simultaneously and independently handle data transfers with a DASD 14 and a host 10. The directory 16 and LRU 47 for cache 15 are also stored in system store 57. Additionally, any using unit 10 can command the storage directors 12 to keep data in cache, i.e. pin or bind the data to cache 15. For all bound tracks, it records a cache bound list 60, stored within directory 58 but shown separately for clarity, indicates to both storage directors 12 which data stored in cache 15 is to remain in cache 15. Such bound data is not listed in LRU 47 for preventing replace program 45 from reallocating cache 15 space.

Access to DASDs 14 is via a so-called daisy string arrangement in which a plurality of DASDs 14 are connected to the storage directors 12 via controllers 65, separately denominated as DCA through DCD. Each storage director 12 connects to the controllers 65 via a daisy-chain device connection 13. A radial connection of known design may also be employed. The operation of the FIG. 2 illustrated system in accordance with the invention is best understood by referring to FIG. 3, a machine operations chart.

Programmed processor 17 at 70 receives a storage-access request. This request is decoded and evaluated in ACE 52 using known techniques. At 71, programmed processor 17 DAC 53 portion examines the CD latch 59 (FIG. 2) related to the DASD 14 addressed in the received storage-access request to determine whether cache 15 or only DASD 14 to the exclusion of cache 15 is to be accessed. For a direct access, DASD 14 is accessed at 72 using usual DASD access methods. For a cache C access, programmed processor 17 searches directory 16 at 73 to determine whether or not the track requested in the received storage-access request (I/O command) has allocated space in cache 15. In this regard it is noted that some commands will require a direct connection to DASD 14 to the exclusion of cache 15. Accordingly, ACE 52 in detecting such a received I/O command sets latch 59 for the addressed DASD 14 to the direct mode "D". An example of such an I/O command is to recalibrate a DASD 14. Searches and SEARCH ID EQUAL commands can be performed for cache 15 accesses within directory 16, i.e. the commands are performed in a virtual manner not involving DASD 14. In the preferred embodiment directory 16 does not separately identify records in a track; only tracks are identified, no limitation thereto intended. Upon completion of the directory 16 search, programmed processor 17 at 74 determines whether or not a cache-hit has occurred. If a cache-hit occurred, which is preferred programmed processor 17 at 74A transfers the P1 stored in section 22 of the directory 16 register identified by the received DASD 14 address to SSAR-0; then it transfers P2 and P3 respectively to SSAR-1 and SSAR-2 from their respective storage locations.

At step 75, director 12 examines cache 15 to determine whether or not the record to be accessed is stored in cache 15 (record hit). If the addressed record is in cache 15 (record hit is yes), then additional segments may not be needed to successfully complete the ensuing data transfer. Then at step 76 the type of data transfer operation to be performed is examined. For a read operation R (transfer of data to a host 10), director 12 at step 77 transfers the requested data from cache 15 to the requesting host 10. Such transfer completes the operation permitting director 12 to exit the machine operation at 78 for performing other data processing operations. For a write operation W (transfer of data from a host 10) indicated at step 76, director 12 at step 80 examines the received host 10 supplied command for ascertaining if the write is a FORMAT write (access to DASD 14 is requested to the exclusion of cache 15) or any other form of write (cache 15 is to be utilized) is requested. For a FORMAT write, director 12 in step 81 deallocates any allocated cache 15 data-storage space and transfers the received data to DASD 14. For a nonformat write (FORMAT=0) at step 80, director 12 in step 82 transfers data from the requesting host 10 to both cache 15 and DASD 14 respective addressed data-storage areas. In this manner, cache 15 and DASD 14 always have identical copies of the same data. From steps 81 and 82, director 12 proceeds to other data processing operations via logic path 78. This operation allows less than a full track allocation in cache to handle successive data transfers (partial track allocations).

Returning to step 75, when director 12 does not find the addressed record (record hit is no), then for the impending data transfer to the cache, additional segments may be allocated for the ensuing data transfer. In steps 85 and 86 director 12 examines the values of P2 and P3. For either or both pointers being zero (no corresponding space has been allocated in cache 15), director 12 in step 86 allocates an additional segment to the track, as previously described and then proceeds to transfer data to cache 15 at 87. The step 87 data transfer can be a write from a host 10 to DASD 14 and cache 15, a read from DASD 14 to cache 15 and a host 10, or a staging data operation from DASD 14 to cache 15.

The post-transfer machine operations find director 12 examining cache 15 to determine which of the three allocated segments in fact received data from the just-completed data transfer. In step 88, director 12 examines a later-described "k-counter" 129 (FIG. 4) to ascertain the values 1, 2 or 3 which respectively indicate that one, two or three allocated segments (corresponding to P1, P2, P3) in fact received and are currently storing data. For k=1, director 12 in step 90 takes the segments 2 and 3 (also termed XM and YM, respectively) identifications and inserts same into the LRU list for making these segments available for allocation. In step 91, the corresponding pointers P2 and P3 are set to zero. For a value k=2 in step 88, director 12 in steps 92 and 93 inserts the third segment YM into the LRU list and sets pointer P3 to zero. For a value of k=3 in step 88, director 12 knows that all three segments have received and are currently storing data, hence it proceeds directly to do other data processing operations through logic path 78. Path 78 is also entered from steps 91 and 93, as well.

For a cache miss at 74 (hit=0), director 12 in steps 95 and 96 allocates three segments in cache 15 (XY, XM, YM) for the ensuing data transfer to cache 15 and sets the corresponding pointers P1, P2 and P3 in the respective SSAR's 0, 1 and 2. Then director 12 proceeds to the data transfer operation performed in step 87, as previously described.

In one embodiment of directory 16, each of the registers in directory 16 corresponded to a space 28 in cache 15. Hence, area 22 is dispensed with the register address within directory 16 also indicating (using base plus offset addressing) the beginning address in cache 15 of an associated space. Allocation then consists of inserting the appropriate DASD address in section 20 of such register. Addresses XM and YM respectively become pointers P2 and P3 and are stored in areas 24, 26 of the area 23 corresponding to address XY. Note there are no changes in directory 16 for these last two pointers. In the event that the last above-described directory 16 structures wherein a given register always is associated with a data-storage area of cache 15, then addresses P2 and P3 are inserted in these respective directory 16 registers; the registers for P2 and P3 are then omitted from LRU 47. The above completes setting up the pointers for the ensuing data transfer.

FIG. 4 illustrates cache 15 addressing circuits usable with the present invention. The data paths 100 extend from cache 15 through memory circuits 56 thence to DASD circuits 55 for data transfers with DASD 14. The data paths also extend to the channel adaptors 50 for data transfers with using unit 10, all as shown in FIG. 2. The data transfers between cache 15, adaptors 50 and DASD circuits 55 are under the control of usual automatic data-transfer circuits of known design and of current use in DASD storage systems. Such automatic transfer control circuits are shown as autocontrol 101 in FIG. 4 as being a part of memory circuits 56. Programmed processor 17 supplies a suitable start signal over line 102 to autocontrol 101. The description assumes the storage system address registers 30 have been loaded with the appropriate addresses P1, P2 and P3 received from programmed processor 17 respectively over address busses 110, 111 and 112. Such loading of address registers by a programmed processor is well known. Once autocontrol 101 receives the START signal, it supplies a cache 15 access enabling signal over line 103 to cache 15. As a result, cache 15 will receive addresses as later described for accessing data-storage registers within the cache. The access-control signal on line 103 will carry an indication of whether the operation is a read-from-cache operation or a write-to-cache operation. Many caches 15 contain known refresh circuits which interleave refresh cycles with data-access cycles. Each time cache 15 transfers a set of data signals over data path 100, it indicates a cycle of operation to autocontrol 101 over line 104. Autocontrol 101 has been preset in a known manner for transferring a given number of data signals between cache 15 and either DASD 14 or host 10. When data signals are being written into cache 15, autocontrol 101 may not know the number of signals to be received. In this instance, a second signal is supplied over start line 102 to turn autocontrol 101 off for removing the signal on line 103. For example, in a host-to-cache data transfer, the host using the IBM 370 interface architecture can send a socalled COMMAND OUT I/O tag signal indicating the end of the data transfer. Such I/O tag signal results in programmed processor 17 sending a second signal on start line 102 to indicate to autocontrol 101 to terminate the data transfer. Termination of the data transfer either internally to autocontrol 101 or to externally received commands is indicated to programmed processor 15 by an END signal supplied over line 105. For each cycle of cache 15 operation, autocontrol 101 emits an address incrementing signal over line 115. The incrementing signal goes to one and only one of the SSARs 30 as selected by an SSAR address received over bus 130 from programmed processor 17. The addressing of a plurality of address registers is well known and not described for that reason. When P1, P2 and P3 are loaded, the SSAR address signals received from programmed processor 17 will select SSAR-0. Decoder 131 decodes the address signal and supplies an AND circuit enabling signal over line 132 to AND circuits 116 and 120; AND circuit 116 passes the address incrementing signal on line 115 to SSAR-0 for incrementing the address contained therein. Decrementing can be used as well. Each time SSAR-0 is incremented, it supplies a set of address signals to AND circuits 120 for transmitting same over the address bus 123 to cache 15 for selecting the next data-storage location within the cache 15 addressed data-storage space for the data transfer. When the SSAR-0 has counted through all of the addressable data-storage locations within one data-storage space 28 of cache 15, it supplies a carry signal over line 126 through OR circuit 125 for incrementing segment counter 129. Segment counter 129, which counts segments having $2^k$ data-storage locations (k is an integer), has been preset to zero through a reset signal received from programmed processor 17 overline 140. Segment counter 129 supplies a zero signal over line 141 to decoder 131 for passing the received SSAR-0 address signal to decoding circuits resulting in the line 132 and enabling signal. When segment counter 129 is incremented by the SSAR-0 carry signal, it then supplies a one signal over line 142 to decoder 131.

Decoder 131 is of the type that can add one to the received SSAR address such that the line 132 AND-circuit enabling signal is removed and a new AND-circuit enabling signal is supplied over line 133. Such signal enables AND circuits 117 and 121 associated with SSAR-1. AND circuit 117 enables the address-incrementing signal on line 115 to increment SSAR-1 and then to supply address signals through AND circuits 121 to cache 15. In a similar manner SSAR-1 supplies its carry signal over line 127 to also increment segment counter 129 resulting in a two signal being supplied over line 143 to decoder 131. This causes decoder 131 to add two to the received SSAR address resulting in an AND-circuit enabling signal being sent only over line 134 to AND circuits 118 and 122 associated with SSAR-2. SSAR-2 then receives the address-incrementing signal and supplies the cache data-storage location signals to cache 15 for the third data-storage space being addressed in the sequence of operation.

Segment counter 129 is not restricted to counting segments of $2^k$ sizes. By providing a segment size register, the counter 129 can count segments having any arbitrary size or variably sized segments. For simplicity segment sizes of $2^k$ are preferred.

It is to be appreciated that a larger plurality of SSARs 30 may be provided, as indicated by ellipsis 147. As such, any three of the larger plurality of storage address registers may be used in sequencing cache 15 operation in accordance with the invention. Accordingly, there are a like greater plurality of AND circuits enabling lines indicated by ellipsis 148. In any event, the first storage address register which receives P1 is selected by programmed processor 17 in the usual manner. Programmed processor 17 then indicates which SSAR received the P1 address which starts a sequence of concatenated addresses within cache 15 for successively-accessed data-storage spaces 28. Accordingly, a variable number of data-storage spaces 28 can be used with a diversity of sizes of address spaces for receiving data signals. For example, if two types of DASD 14s are attached to the directors 12, two different sizes of data transfer units (data contents of two DASD tracks have different numbers of stored data bits) may be involved. From a first DASD 14 three data-storage spaces 28 may be concatenated for receiving data signals. For a larger and newer DASD 14, five of the data-storage spaces 28 of cache 14 may be used, and so forth. In the latter instance the director 12 keeps a table (not shown) relating each DASD device address with a unit size of data transfer such that the appropriate number of data-storage spaces 28 may be selected for each receiving data-transfer operation. Some DASD 14s are operated in a front store/back store concept such that a portion of the DASD is addressable separately in a track subunit such as one-third or one-fourth of a track. Other tracks within the same DASD 14 may be addressed only as whole track units. In this case the same principles of the invention can be applied equally. Of course, segment counter 129 has to be adjusted accordingly.

To effect the deallocation of spaces 28, segment counter 129 supplies the number of segments over bus 145 that have been accessed in the current sequence of data transfer operations. Referring back momentarily to FIG. 3, step 110 determines the value of segment counter 129.

Figure 5:
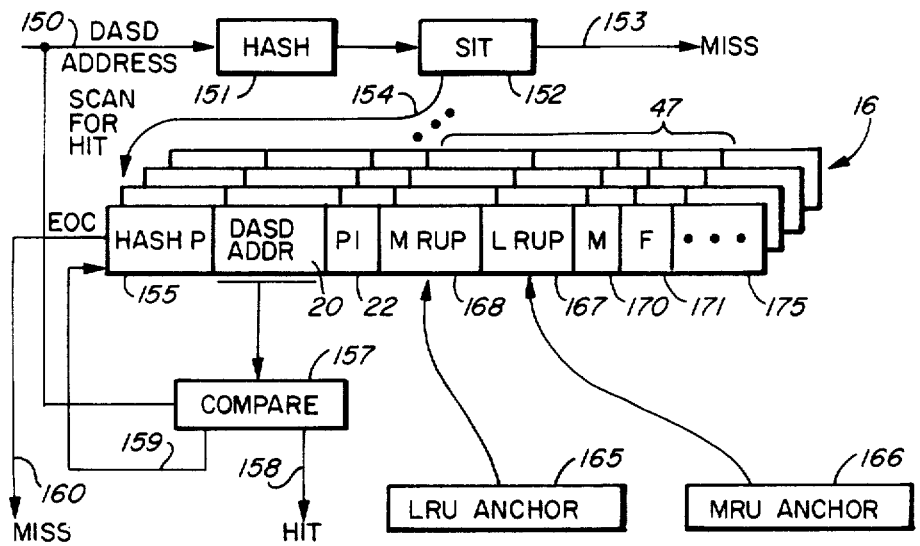
FIG. 5 shows a directory usable with the FIGS. 1 and 2 illustrated data-storage apparatus.

FIG. 5 illustrates the operation of directory 16. Directory 16 includes a plurality of registers, each of which is uniquely associated with one and only one of the data-storage spaces 28 of cache 15. Access to directory 16 is based upon a received DASD 14 address as received over bus 150 from using units 10 via programmed processor 17. A hash circuit 151 analyzes and parses the received DASD address into well known hash classes. The entire address base of all DASDs 14 of a particular data-storage system are divided into classes in accordance with track number, device number and DASD cylinder number (cylinders are all record tracks at one radial location or address). Each hash class has a single register in a scatter index table SIT 152. The output of hash circuit 151 addresses one and only one register in SIT 152. SIT 152 stores the address of a directory 16 register having a DASD address in its section 20 residing in the hash class defined for the given SIT 152 register. Such address is supplied, as indicated by arrow 154, for selecting the indicated one of the directory 16 registers. Within each directory 16 register is a hash pointner (HASH P) 155 which points to the next directory 16 register containing a DASD address within the same hash class. The last directory 16 register in the singly-linked list contains all zeros or a special code indicating it is at the end-of-chain. Accordingly, to scan the directory 16 registers, programmed processor 17 activates hashing circuit 151 for accessing the directory 16 registers from SIT 152 and accesses the first register for comparing the DASD address contained in its section 20 with the received DASD address on bus 150, as indicated by compare circuit 157. If there is a favorable compare, a cache hit has occurred as indicated by a signal on line 158. In the practical embodiment, line 158 is a logic path within programmed processor 17 in a program of instruction, such as program 36. A noncompare is indicated by numeral 159, then the hash pointer 155 is read and the directory 16 register pointed to by that hash pointer has its DASD address portion compared in a like manner. This cycle repeats until either a favorable compare indicates a cache hit or an end-of-chain (EOC) occurs. In the case of EOC, as indicated by numeral 160, a cache miss has occurred.

Each of the directory 16 addresses can contain a P1 pointer in section 22. As mentioned earlier, the actual address of the directory 16 register may be associated with a data-storage area 28 in a linear fashion. By having a P1 section 22 no ordered relationship between directory 16 structure and the organization of cache 15 is required.

LRU 47 also resides within directory 16. Each of the registers of directory 16 has a portion 167 which contains a pointer which points to a directory 16 register corresponding to a data-storage space 28 of cache 15 which is one less recently used than the data storage space pointed to by the current register. In a similar manner, section 168 has a more-recently-used pointer pointing to a directory 16 register corresponding to a data-storage space 28 which is more recently used. Accordingly, sections 167 and 168 are a doubly-linked list of directory 16 registers constituting an indication of the recentness of usage of the various data-storage areas. The least recently used data-storage areas represented by a special code in the LRUP area. While the most recently used data-storage areas indicated by a special code in the MRUP area.

Control store 18 of programmed processor 17 contains socalled LRU and MRU anchors 165 and 166. The LRU anchor 165 contains the address of a directory 16 register which is least recently used, while MRU anchor 166 points to the directory 16 register corresponding to the data-storage space 28 which is most recently used. The updating of the doubly-linked list 167, 168 and the anchors 165, 166 is well known and not described for that reason. When either P2 or P3 is set to zero, as in steps 91 or 93 of FIG. 3, director 17 updates the doubly-linked list 167, 168 by making the corresponding cache 15 segments free (F-bit 171 is set to unity) and relink the freed segments at the LRU end portion of the linked list. Additionally, when DASD 14 is not concurrently updated with data updates in cache 15, LRU 47 then includes a status indicator for the corresponding data-storage spaces 28. M-BIT 170 indicates whether or not the data contents of the corresponding data-storage space 28 has been modified by using unit 10. When M-BIT 170 is zero, the corresponding data-storage space is available for deallocation. Since no data transfer from cache 15 to DASD 14 is required for reallocation, when M-BIT 170 is equal to one (data in cache 15 has been changed), before the corresponding data-storage space is available for reallocation, the data contents of the corresponding data-storage space 28 has to be moved to the associated data-storage area of DASD 14. When DASD 14 and cache 15 are concurrently updated, M-BIT 170 is dispensed with. F-BIT 171 indicates whether or not the data-storage space 28 is free (unallocated) and available for allocation. The LRU scan described with respect to steps 101 and 95 of FIG. 3 begins with the LRU anchor 165 indicated directory 16 register and scans the registers for F-BIT 171 equal to 1 using the doubly-linked list 167 and 168. If the scan finds no free spaces from the F-BITs 171 indicated data-storage spaces, then a second scan for the M-BITs 170=0 is made. Of course, each directory 16 register contains additional control information as indicated by ellipsis 175.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of managing data-storage space in a data-storage unit for storing data receivable in relatively large address spaces and wherein the data contents in the address spaces are often much less than the data-storage capacity thereof; including the machine-executable steps of:
  establishing allocatable addressable data-storage segments within said data-storage unit that are a first submultiple of capacity of said storage space and each of said segments having a first address space less than each of said large address spaces;
  receiving a request to store data in said data-storage unit which is receivable within a one of said large address spaces;
  allocating a first number of said segments in response to said received request such that the total allocated first address space is not less than the data-storage capacity of said one large address space;
  transferring data to said data-storage segments allocated for the data requested to be stored beginning with a first of said allocated segments, filling the first segment with a first portion of said data and storing remaining portion of said data in successive ones of said allocated segments until all data to be stored is in fact stored;
  determining which, if any, of said allocated ones of said allocated segments are in fact storing data and which of said allocated segments are not storing data; and deallocating those allocated segments which are not in fact storing data for later reallocation for storing other data yet to be received and outside said one large address space.

2. The machine-implemented method set forth in claim 1 further including the steps of:

providing a directory of data stored in said data-storage unit including a pointer address to each said first segments for the respective large address spaces having allocated space in said data-storage unit; and storing a pointer address of another one of said allocated segments associated with said first segments whereby the directory structure is independent of the number of segments allocated to any data-storage for any of said large address spaces.

3. The machine-implemented method set forth in claims 1 or 2 wherein a source of data to be stored in said data-storage unit is from a direct access storage device having a plurality of addressable data-storage tracks, each of said tracks having a like data-storage capacity equal to the capacity of each of said large address spaces;

further including the steps of:

after allocating said allocated segments, supplying addresses of all of said allocated segments to a like plurality of address registers in said data-storage unit wherein each of said address registers stores the address of a respective one of said allocated segments; and transferring data from said direct access storage device to said data-storage unit and switching addressing from a one of said address registers to another during said data transfer for not interrupting data transfer in switching from one of said allocated segments to another.

4. The machine-implemented method set forth in claim 1;

further including the steps of:

indicating that a transfer of data into said data-storage unit is less than the capacity of said first address space;

for each data transfer less than the capacity of said first address space, omitting said allocating, determining and deallocating steps set forth in claim 1.

5. The machine-implemented method set forth in claim 1 further including the machine-executable steps of:

indicating that a said large address space has a given extent of data therein and allocating a number of said segments in said allocating steps in accordance with said indicated extent such that a successive one of said data transfers may have a diversity of numbers of said segments allocated for such successive data transfer.

6. The machine-implemented method set forth in claims 1 or 2 further including the steps of:

listing all of said segments in a list in accordance with usage;

whenever a plurality of segments are allocated for a given large address space concatenating all of said allocated segments to a one of said allocated segments and using said one allocated segment as an address for all of said concatenated segments; and binding all of said concatenated segments to said one allocated segment such that whenever said one allocated segment has its data contents replaced by other data, all of said concatenated segments are concurrently made available for allocation.

7. For use in a data-storage hierarchy having a backing store coupled to a front store, each store having a plurality of addressable data-storage spaces, said hierarchy being adapted to be coupled to a host processor for transferring data signals therewith, means for coupling the host processor and said front and back stores together for transferring data signals therebetween;

the improvement including in combination;

means for indicating that data is to be written into said front store;

allocation means coupled to said indicating means for allocating a plurality of allocatable sets of said addressable data-storage spaces in said front store for said data indicated to be written therein, said allocation means also having means indicating that the allocatable unit of said backing store has a given multiple of data-storage spaces equal to the storage capacity of a given number of data-storage spaces in each set of data-storage spaces of said front store;

means coupled and being responsive to said allocation means for allocating said sets of addressable data-storage spaces and to activate said coupling means to transfer said indicated data into said front store for storage in said allocated sets;

examining means coupled to said front store for examining said allocated sets of data-storage spaces for determining which of said allocated data-storage spaces in fact received data signals during said indicated data transfer; and deallocation means coupled to said examining means and to said front store for deallocating all of said data storage paces that in fact did not receive and store data during said indicated data transfer and that were allocated therefor.

8. The improvement set forth in claim 7 further including, in combination:

concatenation means coupled to said front store and said allocation and deallocation means for concatenating all of said data-storage spaces in each of said respective sets of data-storage spaces; and replacement control means coupled to said allocation, said deallocation and said concatenation means for selectively replacing data stored in said data-storage spaces in accordance with usage of a predetermined one of said data-storage spaces in each of said sets of data-storage spaces such that the data-storage spaces in one of said sets are simultaneously available for allocation.

9. The improvement set forth in claim 7 wherein said front store is a volatile random-access memory, said backing store is a plurality of addressable direct access storage devices wherein an addressable portion of said direct access storage devices is a given number of bytes of data which is a predetermined multiple of the data-storage capacity of each of said front store addressable data-storage spaces;

directory means coupled to said front store and adapted for receiving address signals from a coupled host processor, said received address signals are for said direct access storage devices and means in said directory for directing access to said front store whenever data-storage spaces in said front store have been allocated to a corresponding received direct access storage device address; and LRU means for indicating usage of said data-storage spaces and said allocation means and means coupled to said LRU means for selecting those data-storage paces of said front store having a least-recent usage for allocation to said indicated data transfer.

10. In a data-storage hierarchy having a front store and a backing store and adapted to be coupled to a host processor for transferring data signals therewith and having data-transfer means for transferring data signals between said host processor, said front store and said backing store;

a control data processor coupled to all of said stores and to said data transfer means and being adapted to receive commands from the host processor relating to movement of data in the data-storage hierarchy;

said backing store having a plurality of backing store addressable allocatable data-storage spaces each of which has a first data-storage capacity;

said front store having a plurality of front store addressable allocatable data-storage spaces each of which has a second data-storage capacity less than said first data-storage capacity;

a control store coupled to said control data processor for storing first program indicia for enabling said control data processor to indicate that data is to be stored in said front store in a data-storage operation;

second program indicia in said control store for enabling said control data processor to allocate a given number of said front store data-storage spaces for storage of data in said front store which in total yields an allocated data-storage capacity of not less than said first data-storage capacity;

third program indicia in said control store for enabling said control data processor to transfer and store data in said allocated front store data-storage spaces up to said first capacity;

fourth program indicia in said control store for enabling said control data processor upon completion of the data-storage operation to examine which of the allocated spaces allocated by said second program indicia have in fact received and stored or not received and not stored data as a result of the data-storage operation; and fifth program indicia in said control store for enabling said control data processor to deallocate those second indicia allocated data-storage spaces of said front store not in fact storing data as a result of the data storage operation whereby the data-storage space of said front store may be more efficiently utilized.

* * * * *